United States Patent
Jo et al.

(10) Patent No.: US 12,506,766 B2
(45) Date of Patent: Dec. 23, 2025

(54) METHOD FOR EVALUATING SECURITY OF IN-VEHICLE NETWORK

(71) Applicant: AHOPE LTD., Seoul (KR)

(72) Inventors: Sangwon Jo, Hwaseong-si (KR); Yeonwoo Kim, Seoul (KR)

(73) Assignee: AHOPE LTD., Seoul (KR)

( * ) Notice: Subject to any disclaimer, the term of this patent is extended or adjusted under 35 U.S.C. 154(b) by 0 days.

(21) Appl. No.: 19/229,801

(22) Filed: Jun. 5, 2025

(65) Prior Publication Data

US 2025/0301012 A1    Sep. 25, 2025

Related U.S. Application Data

(63) Continuation of application No. PCT/KR2023/018456, filed on Nov. 16, 2023.

(30) Foreign Application Priority Data

Nov. 14, 2023  (KR) .................. 10-2023-0157178

(51) Int. Cl.
| | | |
|---|---|---|
| B60R 16/023 | (2006.01) | |
| H04L 9/40 | (2022.01) | |
| H04L 43/50 | (2022.01) | |
| H04L 67/12 | (2022.01) | |
| H04W 4/40 | (2018.01) | |

(52) U.S. Cl.
CPC .......... H04L 63/1433 (2013.01); H04L 43/50 (2013.01); H04L 67/12 (2013.01)

(58) Field of Classification Search
None
See application file for complete search history.

(56) References Cited

U.S. PATENT DOCUMENTS

| | | | | |
|---|---|---|---|---|
| 2018/0144141 A1* | 5/2018 | Fonbonne | .............. | G06N 20/00 |
| 2019/0141074 A1* | 5/2019 | Oka | .................. | H04L 43/50 |
| 2022/0171697 A1* | 6/2022 | Moukahal | .......... | G06F 11/3684 |

FOREIGN PATENT DOCUMENTS

| | | | | | |
|---|---|---|---|---|---|
| CN | 109379329 A | * | 2/2019 | ............. | G06N 3/126 |
| CN | 113872985 A | * | 12/2021 | ............. | H04L 12/40 |
| CN | 114050979 B | * | 6/2023 | ........... | H04L 41/069 |
| KR | 10-1243079 B1 | | 3/2013 | | |
| KR | 10-1907011 B1 | | 10/2018 | | |
| KR | 10-2019-0004507 A | | 1/2019 | | |
| KR | 10-2022-0118937 A | | 8/2022 | | |

OTHER PUBLICATIONS

NOA of KIPO, issued on Jul. 10, 2024.
OA of KIPO, issued on Jan. 9, 2024.
Hye-ryun Lee et al., "Research of generate a test case to verify the possibility of external threat of the automotive ECU", Sep. 30, 2013.
International Search Report for PCT/KR2023/018456, issued on Jul. 29, 2024.

* cited by examiner

*Primary Examiner* — Christopher B Robinson
(74) *Attorney, Agent, or Firm* — ZION IP; Byungwoong Park

(57) ABSTRACT

A method for evaluating security of an in-vehicle network performed by a computing device comprising at least one processor is disclosed according to some embodiments of the present disclosure. The method for evaluating security of the in-vehicle network may comprise constructing a fuzzing framework for performing a security evaluation method; and performing the security evaluation method using the fuzzing framework.

9 Claims, 5 Drawing Sheets

METHOD FOR EVALUATING SECURITY OF IN-VEHICLE NETWORK

CROSS-REFERENCE TO RELATED APPLICATIONS

This application claims priority from and the benefit of Korean Patent Application No. 10-2023-0157178 filed on Nov. 14, 2023, which are hereby incorporated by reference in its entirety.

BACKGROUND

Field

The present disclosure relates to a method for evaluating security, and more specifically, to a method for evaluating the security of the internal network.
Project Unique Number: 1415181535
Project Number: 20022229
Ministry Name: Ministry of Trade, Industry and Energy
Project Management (Specialized) Organization Name: Korea Planning & Evaluation Institute of Industrial Technology
Research Project Name: Autonomous Driving Technology Development Innovation Project
Research Project Name: Development of Security Evaluation Technology for Internal Network and Wireless Software Update of Autonomous Driving System
Contribution Rate: 1/1
Project Executing Organization Name: AHOPE Co., Ltd.
Research Period: 2022.06.01~2025.12.31

Related Art

The traffic environment of modern society is gradually evolving into an intelligent transportation system. In line with the development of the traffic environment, intelligent vehicles equipped with functions such as infotainment, safety, road assistance, and telematics are being introduced.

Intelligent vehicles have significantly increased the number of electronic control units (ECUs) and electrical and electronic components due to the introduction of various functions within the vehicle. The electronic control unit can be provided throughout the vehicle to perform sensing and computation related to the control of the vehicle body. The electronic control unit may include various ECUs such as an engine (EGN) ECU, an anti-lock braking system (ABS) ECU, a multimedia ECU, a transmission ECU, and a safety-related ECU, and a single vehicle may have approximately 60 to over 100 ECUs.

The ECUs are structured hierarchically, performing their unique functions while also conducting cooperative control with other ECUs. For communication between ECUs, an in-vehicle network (IVN) may be utilized. Examples of in-vehicle networks include a controller area network (CAN), CAN with flexible data rate (CAN FD), or Ethernet.

Meanwhile, as the software of vehicles becomes more complex, the functions of ECUs are rapidly advancing. In response to the addition of new functions, performance improvements, or detection of vehicle abnormalities, ECUs are frequently updated to new versions. The update of ECUs can be performed through wireless or wired communication between the in-vehicle network and an external network. Communication between the in-vehicle network and the external network is expected to occur more frequently with the advancement of autonomous vehicle technology.

Although communication between the in-vehicle network and the external network may be semi-essential for improving vehicle performance, it may also increase security threats to the in-vehicle network or ECUs.

SUMMARY

The present disclosure has been devised in response to the aforementioned background art and aims to provide a method for evaluating the security of an in-vehicle network.

The technical problems of the present disclosure are not limited to the technical problems mentioned above, and other technical problems not mentioned will be clearly understood by those skilled in the art from the following description.

According to one embodiment of the present disclosure for solving the above-described problem, a method for evaluating security of an in-vehicle network performed by a computing device including at least one processor is disclosed. The method for evaluating security of the in-vehicle network comprises constructing a fuzzing framework for performing a security evaluation method; and performing the security evaluation method using the fuzzing framework; wherein the security evaluation method comprises extracting a message list from a CAN DB file; generating at least one test case using messages included in the extracted message list; injecting a first test case among the at least one test case into a target control device constituting the in-vehicle network; performing an analysis on whether the target control device is abnormal according to an injection of the first test case; and determining whether to inject a second test case among the at least one test case based on whether the target control device is abnormal, wherein the generating at least one test case using messages included in the message list comprises: generating the at least one test case according to a fuzzing algorithm; wherein the fuzzing algorithm comprises at least one of dump fuzzing algorithm, generation based fuzzing algorithm, mutation-based fuzzing algorithm, evolutionary fuzzing algorithm, and stateful fuzzing algorithm.

In addition, the step of constructing a fuzzing framework for performing the security evaluation method may comprise constructing a first requirement for a scope of a fuzzer; constructing a second requirement for the at least one test case; constructing a third requirement for a protocol of the in-vehicle network; constructing a fourth requirement for logging of the in-vehicle network; constructing a fifth requirement for replay of an attack method for the target control device; and constructing a sixth requirement for a result report.

In addition, the first requirement may comprise at least one of a first-1 requirement for generating a test case for a pre-set message in the CAN DB file, a first-2 requirement for performing a fuzzing test for a UDS (Unified Diagnostic Services) protocol message, a first-3 requirement for performing fuzzing through randomization of data within a designated range, and a first-4 requirement for performing fuzzing through randomization of the entire CAN message.

In addition, the second requirement may comprise at least one of a second-1 requirement for generating a test case based on a user-set structure and a second-2 requirement for enabling modification of the generated test case.

In addition, the third requirement may comprise at least one of a third-1 requirement for a protocol for supporting CAN communication and CAN-FD communication and a third-2 requirement for a protocol for supporting Ethernet.

In addition, the fourth requirement may comprise at least one of a fourth-1 requirement for logging all CAN messages in CAN communication, a fourth-2 requirement for logging all messages in connected CAN communication, and a fourth-3 requirement for output and extraction of a log file.

In addition, the fifth requirement may comprise at least one of a fifth-1 requirement for enabling a replay attack when a vulnerability of the target control device is discovered in response to an attack on the target control device using a corresponding message, a fifth-2 requirement for automatically proceeding with replay, and a fifth-3 requirement for manually proceeding with replay.

In addition, the sixth requirement may comprise at least one of a sixth-1 requirement for providing a report on discovered vulnerabilities and a sixth-2 requirement for extracting a final discovered vulnerability result as a local file.

In addition, the step of generating at least one test case using messages included in the extracted message list comprises generating the at least one test case according to a fuzzing algorithm; wherein the fuzzing algorithm may comprise at least one of a dump fuzzing algorithm, a generation based fuzzing algorithm, a mutation-based fuzzing algorithm, an evolutionary fuzzing algorithm, and a stateful fuzzing algorithm.

In addition, the step of performing an analysis on whether the target control device is abnormal according to an injection of the first test case comprises transmitting a status check message to the target control device; determining the first test case as a risk candidate when a response to the status check message is not received; restarting the target control device; retransmitting the first test case to the restarted target control device; transmitting the status check message to the restarted target control device; and determining the first test case as a vulnerable case when a response to the status check message is not received.

In addition, a computing device for evaluating security of an in-vehicle network comprises a control unit configured to construct a fuzzing framework for performing a security evaluation method and perform the security evaluation method using the fuzzing framework; wherein the security evaluation method comprises extracting a message list from a CAN DB file; generating at least one test case using messages included in the extracted message list; injecting a first test case among the at least one test case into a target control device constituting the in-vehicle network; performing an analysis on whether the target control device is abnormal according to an injection of the first test case; and determining whether to inject a second test case among the at least one test case based on whether the target control device is abnormal, wherein the generating at least one test case using messages included in the message list comprises: generating the at least one test case according to a fuzzing algorithm; wherein the fuzzing algorithm comprises at least one of dump fuzzing algorithm, generation based fuzzing algorithm, mutation-based fuzzing algorithm, evolutionary fuzzing algorithm, and stateful fuzzing algorithm.

The technical means that can be obtained from the present disclosure are not limited to the means mentioned above, and other means not mentioned will be clearly understood by those skilled in the art to which the present disclosure pertains from the following description.

The present disclosure provides a method for evaluating the security of an in-vehicle network so that a secure system safe from threats to a vehicle system can be constructed according to some embodiments of the present disclosure.

The effects obtainable from the present disclosure are not limited to the effects mentioned above, and other effects not mentioned will be clearly understood by those of ordinary skill in the art to which the present disclosure pertains from the description below.

BRIEF DESCRIPTION OF THE FIGURES

Various aspects are now described with reference to the drawings, wherein like reference numerals are used to collectively refer to like components. In the following embodiments, for the purpose of explanation, numerous specific details are set forth to provide a thorough understanding of one or more aspects. However, it will be apparent that such aspect(s) may be practiced without these specific details. In other instances, well-known structures and devices are shown in block diagram form to facilitate the description of one or more aspects.

DETAILED DESCRIPTION

Figure 1:
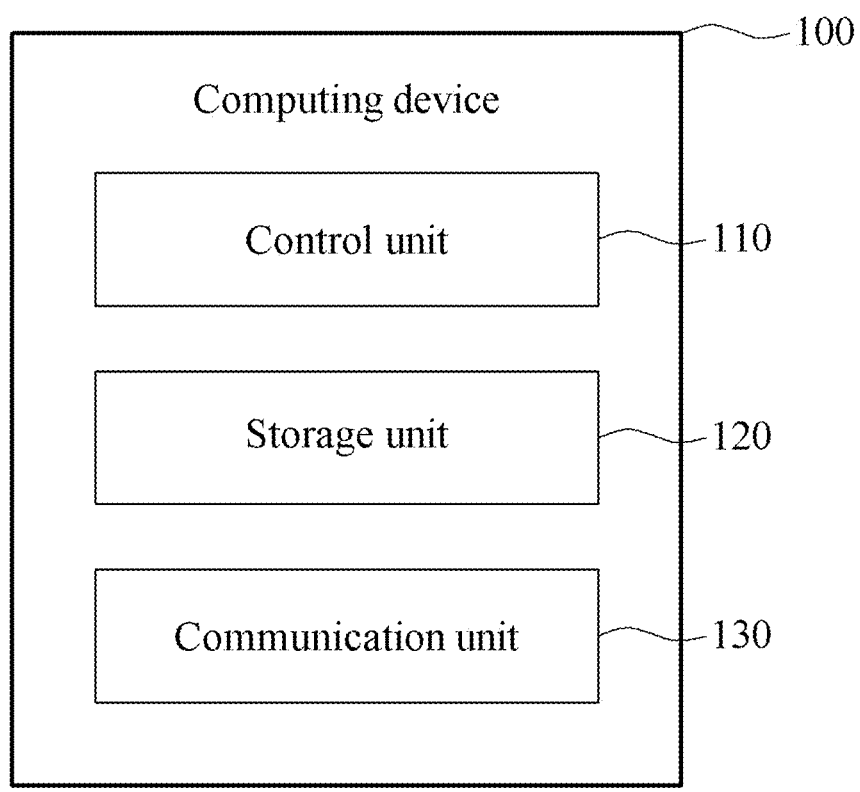
FIG. 1 is a block diagram illustrating an example of a computing device according to some embodiments of the present disclosure.

The present invention may undergo various modifications and have various embodiments, and specific embodiments are illustrated in the drawings and described in detail in the detailed description. However, this is not intended to limit the invention to specific embodiments, and it should be understood to include all modifications, equivalents, and substitutes included within the spirit and scope of the invention. Similar reference numerals are used for similar components while describing each drawing.

The terms first, second, A, B, etc., may be used to describe various components, but the components should not be limited by these terms. These terms are used only to distinguish one component from another. For example, without departing from the scope of the present invention, a first component may be referred to as a second component, and similarly, the second component may also be referred to as the first component. The term and/or includes a combination of a plurality of related listed items or any of the plurality of related listed items.

When a component is referred to as being "connected to" or "coupled to" another component, it should be understood that it may be directly connected or coupled to the other component, or there may be intervening components. In contrast, when a component is referred to as being "directly connected to" or "directly coupled to" another component, it should be understood that there are no intervening components.

The terms used in this application are merely for describing specific embodiments and are not intended to limit the invention. Singular expressions include plural expressions unless the context clearly indicates otherwise. In this application, terms such as "comprising" or "having" are intended to specify the presence of features, numbers, steps, operations, components, parts, or combinations thereof described in the specification, and should not be understood to preclude the possibility of the presence or addition of one or more other features, numbers, steps, operations, components, parts, or combinations thereof.

Unless otherwise defined, all terms used herein, including technical and scientific terms, have the same meaning as commonly understood by one of ordinary skill in the art to which this invention belongs. Terms defined in commonly used dictionaries should be interpreted as having meanings consistent with the context of the related technology and should not be interpreted in an idealized or overly formal sense unless explicitly defined herein.

In the present disclosure, a computing device may evaluate the security of an in-vehicle network by performing a security evaluation method. The computing device may construct a fuzzing framework for performing the security evaluation method. Here, fuzzing may be a method for testing vulnerabilities in software. Furthermore, the fuzzing framework may be understood as a tool constructed to test vulnerabilities in software. The computing device may evaluate the security of the in-vehicle network by performing the security evaluation method using the fuzzing framework. Hereinafter, a method by which the computing device evaluates the security of the in-vehicle network will be described with reference to FIGS. 1 to 4.

FIG. 1 is a block diagram illustrating an example of a computing device according to some embodiments of the present disclosure.

Referring to FIG. 1, the computing device 100 may comprise a control unit 110, a storage unit 120, and a communication unit 130. However, the aforementioned components are not essential for implementing the computing device 100, and the computing device 100 may have more or fewer components than those listed above.

The computing device 100 may include any type of computer system or computer device, such as a microprocessor, mainframe computer, digital processor, portable device, or device control unit.

The computing device 100 may achieve desired system performance using a combination of typical computer hardware (e.g., devices including computer processors, memory, storage, input devices, and output devices, and other components of conventional computing devices; electronic communication devices such as routers and switches; electronic information storage systems such as network-attached storage (NAS) and storage area networks (SAN)) and computer software (i.e., instructions that enable the computing device to function in a specific manner).

The control unit 110 may generally handle the overall operation of the computing device 100. The control unit 110 may process signals, data, information, etc., input or output through the components of the computing device 100 or drive applications stored in the storage unit 120 to provide or process appropriate information or functions for the user.

The control unit 110 may be composed of one or more cores and may include processors for data analysis, such as a Central Processing Unit (CPU), a General Purpose Graphics Processing Unit (GPGPU), or a Tensor Processing Unit (TPU).

In the present disclosure, the control unit 110 may construct a fuzzing framework to perform the security evaluation method.

For example, the control unit 110 may construct a fuzzing framework to establish requirements for the scope of a fuzzer, requirements for test cases, requirements for protocols of the in-vehicle network, requirements for logging of the in-vehicle network, requirements for replay of attack methods for the target control device, and requirements for result reports.

Hereinafter, an example of a method by which the control unit 110 constructs the fuzzing framework will be described with reference to FIG. 2.

The storage unit 120 may include memory and/or a permanent storage medium. The memory may include at least one type of storage medium, such as flash memory type, hard disk type, multimedia card micro type, card-type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, or optical disk.

In the present disclosure, the storage unit 120 may store a database constructed by the control unit 110. The control unit 110 may store, retrieve, or modify test models, fuzzing algorithms, known vulnerabilities, attack scenarios, security threats, and vulnerability information constructed as a database.

The communication unit 130 may include one or more modules that enable communication between the computing device 100 and a communication system, between the computing device 100 and a vehicle, or between the computing device 100 and a network.

Hereinafter, a specific example of how the computing device 100 evaluates the security of the in-vehicle network will be described.

Figure 2:
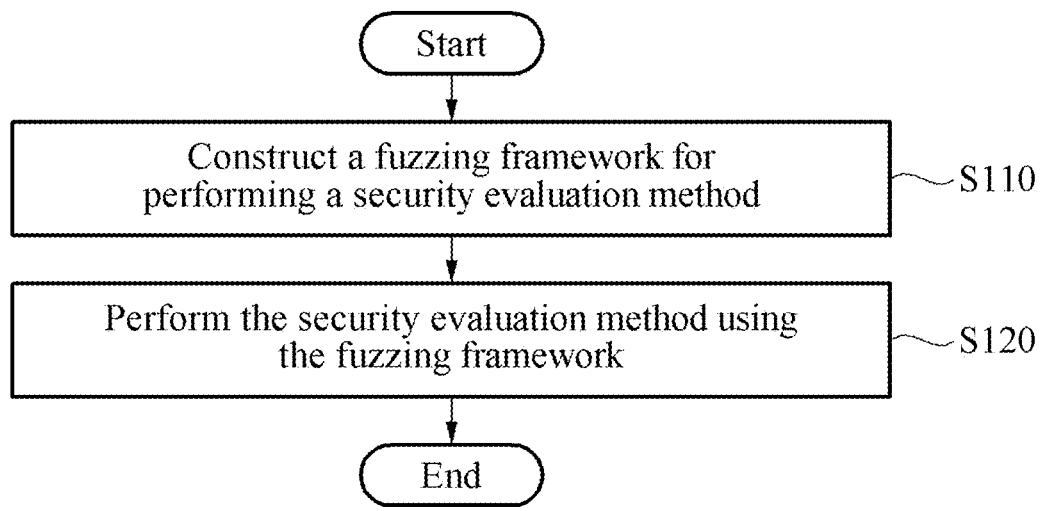
FIG. 2 is a flowchart illustrating an example of a method performed by a computing device for evaluating security of an in-vehicle network according to some embodiments of the present disclosure.
Figure 3:
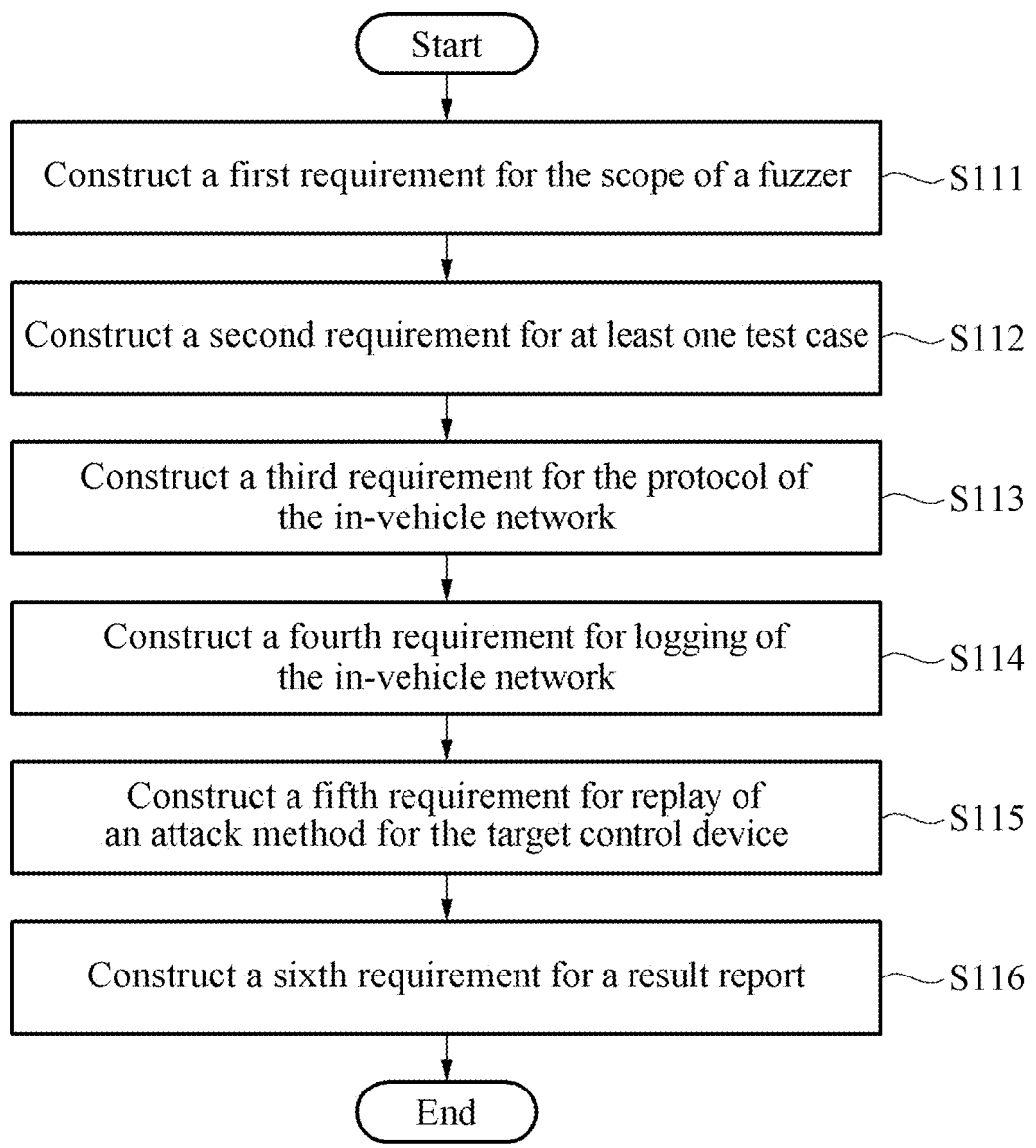
FIG. 3 is a flowchart illustrating an example of a method for constructing a fuzzing framework performed by a computing device according to some embodiments of the present disclosure.

FIG. 2 is a flowchart illustrating an example of a method by which the computing device evaluates the security of the in-vehicle network according to some embodiments of the present disclosure. FIG. 3 is a flowchart illustrating an example of a method by which the computing device constructs a fuzzing framework according to some embodiments of the present disclosure.

Referring to FIG. 2, the control unit 110 of the computing device 100 may construct a fuzzing framework for performing a security evaluation method (S110). Here, fuzzing may be a method for testing vulnerabilities in software. Further, the fuzzing framework may be understood as a tool constructed to test vulnerabilities in software.

Fuzzing may include black-box testing techniques, gray-box testing techniques, and white-box testing techniques, depending on the understanding of the software under analysis.

The black-box testing technique may be a testing technique performed without prior knowledge of the source code, internal structure, or internal operation of the software under analysis. When using the black-box testing technique, the tester may only have knowledge of the input and output values of the program and may perform tests based on exceptions observed externally to the program. The black-box testing technique may allow general users without special knowledge to perform tests, and the time required to generate test cases may be relatively shorter compared to the white-box testing technique, but the code coverage may be lower. Examples of black-box testing techniques may include equivalence partitioning, boundary value analysis, cause-effect graphing, orthogonal array testing, and state transition testing.

The gray-box testing technique may be a testing technique performed with limited knowledge of the internal operation of the software under analysis. When using the gray-box testing technique, the tester may need to have some prior knowledge of the internal data structure or algorithms of the program. The gray-box testing technique may have the advantages of both the black-box testing technique and the white-box testing technique, but the code coverage may generally be lower compared to the white-box testing technique. Examples of gray-box testing techniques may include orthogonal array testing, matrix testing, regression testing, and pattern testing.

The white-box testing technique may be a testing technique performed with prior knowledge of the internal logic and internal structure of the software under analysis. When using the white-box testing technique, the tester may need to have all necessary knowledge of the program's source code and may require a certain level of expertise in the program to perform the tests. The white-box testing technique may identify implementation errors in the program or errors hidden within the code that are difficult to find using the black-box testing technique. Since the white-box testing technique involves knowledge of the source code, the code coverage may be high, but the time required to generate test cases may be relatively longer compared to the black-box testing technique. Examples of white-box testing techniques may include control flow testing, branch testing, basis path testing, data flow testing, and loop testing.

The control unit 110 may construct the fuzzing framework to include at least one requirement. Here, the requirement may be understood as defining the performance that the fuzzing framework must satisfy. For convenience of explanation, FIG. 3 may be referred to.

Referring to FIG. 3, the control unit 110 may construct a first requirement for the scope of a fuzzer (S111). The fuzzer may be a method of injecting semi-random data into the target software and may be understood as the same or a similar concept to fuzzing. The scope of the fuzzer may be understood as the range in which data is generated. The scope of the fuzzer may also be understood as the range of messages for generating test cases. By constructing the first requirement, the control unit 110 may determine the scope of the fuzzer.

The first requirement may include at least one of the first-1 requirement to the first-4 requirement.

The first-1 requirement may be a requirement for generating test cases for pre-set messages in a CAN DB file (DBC file). The CAN DB file may be a network database file used in CAN communication. The CAN DB file may be obtained from a manufacturer and pre-stored in the storage unit 120. The control unit 110 may construct the first-1 requirement to perform the security evaluation method by reading the CAN DB file and generating test cases for pre-set messages in the database.

The first-2 requirement may be a requirement for performing fuzzing tests for UDS (Unified Diagnostic Services) protocol messages. The UDS protocol may be a diagnostic communication protocol used for diagnosing, testing, or repairing electronic control units (ECUs) in a vehicle. UDS protocol messages may be messages transmitted to perform the aforementioned operations. The control unit 110 may construct the first-2 requirement to perform the security evaluation method for UDS protocol messages.

The first-3 requirement may be a requirement for performing fuzzing through randomization of data within a designated range. The control unit 110 may construct the first-3 requirement so that the security evaluation method is performed through fuzzing by randomizing data within a designated range.

The first-4 requirement may be a requirement for performing fuzzing through randomization of the entire CAN message. The control unit 110 may construct the first-4 requirement so that the security evaluation method is performed through fuzzing by randomizing the entire CAN message.

The control unit 110 may construct a second requirement for at least one test case (S112). The test case may be an attack to be injected into the target control device.

The second requirement may include at least one of the second-1 requirement and the second-2 requirement.

The second-1 requirement may be a requirement for generating test cases based on a user-set structure. The structure may be understood as the structure of the test case. When performing the security evaluation method, the control unit 110 may construct the second-1 requirement so that test cases are generated based on a user-set structure.

The second-2 requirement may be a requirement for enabling modification of the generated test cases. The control unit 110 may construct the second-2 requirement so that the generated test cases can be modified.

The control unit 110 may construct a third requirement for the protocol of the in-vehicle network (S113). The protocol of the in-vehicle network may be understood as a communication protocol.

The third requirement may include at least one of the third-1 requirement and the third-2 requirement.

The third-1 requirement may be a requirement for a protocol for supporting CAN communication and CAN-FD communication. When performing the security evaluation method, the control unit 110 may construct the third-1 requirement so that the security evaluation method is performed through a protocol for supporting CAN communication and CAN-FD communication.

The third-2 requirement may be a requirement for a protocol for supporting Ethernet. When the control unit 110 performs the security evaluation method, the third-2 requirement may be constructed so that the security evaluation method can be performed through a protocol for supporting Ethernet.

The control unit 110 may construct a fourth requirement for logging of the in-vehicle network (S114). Logging may be an operation of recording logs, which are operation information of the system.

The fourth requirement may comprise at least one of the fourth-1 requirement to the fourth-3 requirement.

The fourth-1 requirement may be a requirement for logging all CAN messages in CAN communication. When the control unit 110 performs the security evaluation method, the fourth-1 requirement may be constructed so that logging of all CAN messages in CAN communication is performed.

The fourth-2 requirement may be a requirement for logging all messages in connected CAN communication. When the control unit 110 performs the security evaluation method, the fourth-2 requirement may be constructed so that logging of all messages in connected CAN communication is performed.

The fourth-3 requirement may be a requirement for output and extraction of a log file. When the control unit 110 performs the security evaluation method, the fourth-3 requirement may be constructed so that output and extraction of a log file are performed.

The control unit 110 may construct a fifth requirement for replay of an attack method for the target control device (S115).

The fifth requirement may comprise at least one of the fifth-1 requirement to the fifth-3 requirement.

The fifth-1 requirement may be a requirement for enabling a replay attack using the corresponding message when a vulnerability of the target control device is discovered in response to an attack on the target control device. When the control unit 110 performs the security evaluation method and a vulnerability of the target control device is discovered in response to an attack on the target control device, the fifth-1 requirement may be constructed so that a replay attack using the corresponding message is enabled.

The fifth-2 requirement may be a requirement for automatically proceeding with replay. When the control unit 110 performs the security evaluation method and a vulnerability of the target control device is discovered in response to an attack on the target control device, the fifth-2 requirement may be constructed so that replay is automatically proceeded.

The fifth-3 requirement may be a requirement for manually proceeding with replay. When the control unit 110 performs the security evaluation method and a vulnerability of the target control device is discovered in response to an attack on the target control device, the fifth-3 requirement may be constructed so that replay is manually proceeded.

The control unit 110 may construct a sixth requirement for a result report (S116).

The sixth requirement may comprise at least one of the sixth-1 requirement and the sixth-2 requirement.

The sixth-1 requirement may be a requirement for providing a report on discovered vulnerabilities. When a vulnerability is discovered by performing the security evaluation method, the control unit 110 may construct the sixth-1 requirement so that a report on the discovered vulnerability is provided.

The sixth-2 requirement may be a requirement for extracting a final discovered vulnerability result as a local file. The control unit 110 may construct the sixth-2 requirement so that the final discovered vulnerability result is extracted as a local file.

The control unit 110 may perform the security evaluation method using the fuzzing framework (S120).

Specifically, the control unit 110 may evaluate the security of the target control device or the in-vehicle network by injecting an attack into the internal network in which communication between control devices in the vehicle is performed using the fuzzing framework. Here, the target control device may be an ECU (Electronic Control Unit) or a DCU (Domain Control Unit).

According to one embodiment, the control unit 110 may construct a test environment in which a plurality of control devices perform communication in a virtual vehicle environment.

For example, when the target control device is a physical device, the control unit 110 may construct a HILS (Hardware-in-the-Loop Simulation) test environment in which the target control device performs communication in a virtual vehicle environment. The control unit 110 may control the target control device to implement communication in the constructed HILS test environment. For example, the computing device 100 may be connected to the target control device through a harness. The control unit 110 may control the target control device through the harness so that the target control device performs an operation in the HILS test environment implemented by the computing device 100. According to one embodiment, the HILS test environment may also be implemented through a separate simulator. In this case, the computing device 100 may be connected to the simulator in which the test environment is constructed and the harness, etc. The control unit 110 may control the simulator or the target control device through the harness so that the target control device performs an operation in the HILS test environment implemented by the simulator.

In another example, when the target control device is a virtual device, the control unit 110 may construct a SILS (Software-in-the-Loop Simulation) test environment in which the target control device performs communication in a virtual vehicle environment. The control unit 110 may control the virtual target control device to implement communication in the constructed SILS test environment. According to one embodiment, the SILS test environment may also be implemented through a separate simulator. In this case, the computing device 100 may be connected to the simulator in which the test environment is constructed and the harness, etc. The control unit 110 may control the simulator or the target control device through the harness so that the target control device performs communication in the SILS test environment implemented by the simulator.

According to the above configuration, the computing device 100 may construct a fuzzing framework to satisfy the first requirement to the sixth requirement in order to perform the security evaluation method. Then, the computing device 100 may perform the security evaluation method for the target control device using the constructed fuzzing framework. Accordingly, the reliability of the performed security evaluation may be excellent.

Hereinafter, an example of a method for performing the security evaluation method using the fuzzing framework constructed by the computing device will be described.

Figure 4:
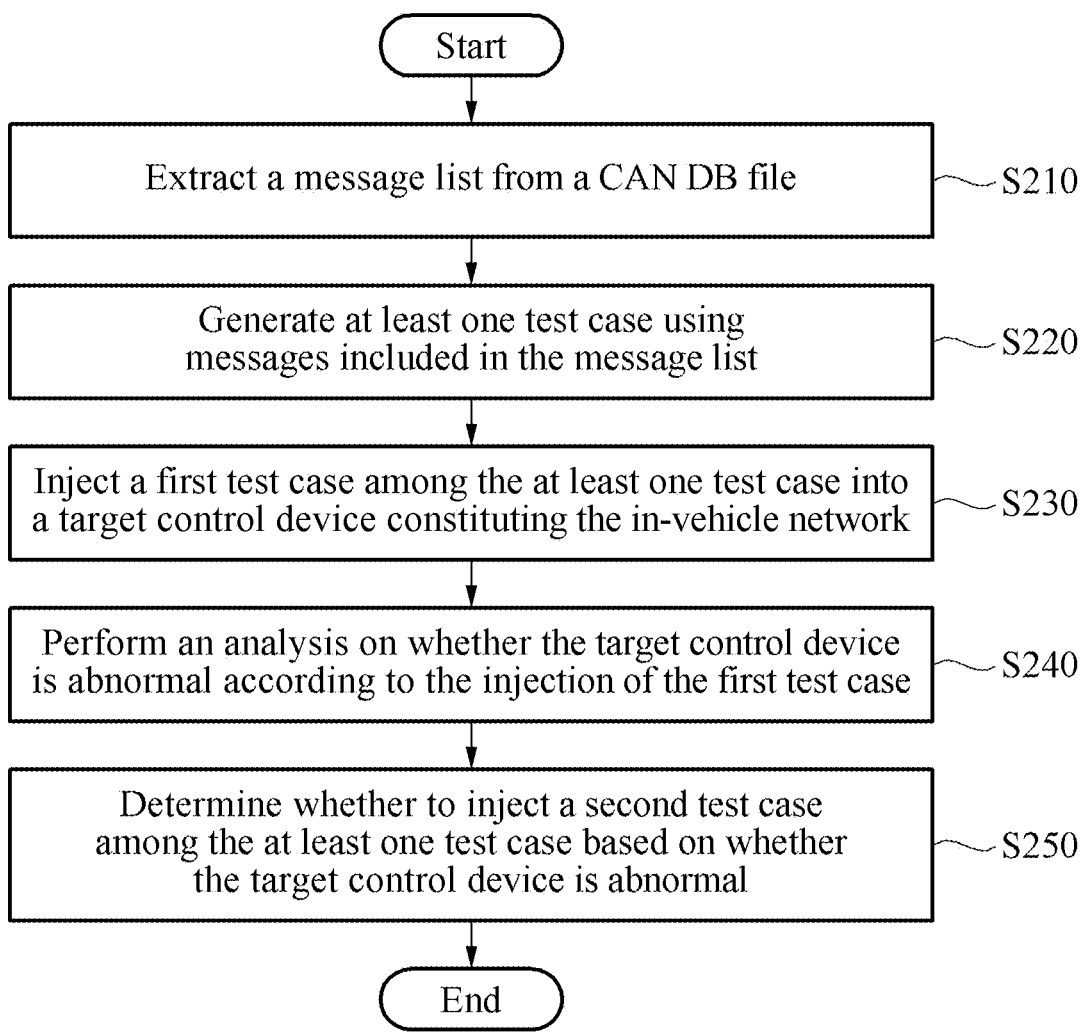
FIG. 4 is a flowchart illustrating an example of a method for performing a security evaluation method using a constructed fuzzing framework performed by a computing device according to some embodiments of the present disclosure.

FIG. 4 is a flowchart illustrating an example of a method for performing the security evaluation method using the fuzzing framework constructed by the computing device according to some embodiments of the present disclosure.

Referring to FIG. 4, the control unit 110 of the computing device 100 may extract a message list from a CAN DB file (S210).

Specifically, the control unit 110 may extract a message list from a CAN DB file through the fuzzing framework in which the first requirement for the scope of the fuzzer is constructed.

The control unit 110 may generate at least one test case using messages included in the message list (S220). Here, the test case may be a case for an attack on the target control device.

Specifically, the control unit 110 may generate at least one test case through the fuzzing framework in which the second requirement for the at least one test case is constructed.

According to one embodiment, the control unit 110 may generate at least one test case according to a fuzzing algorithm. The fuzzing algorithm may be an algorithm that generates an attack script to identify the location of vulnerabilities where collisions occur by inputting numerous data. The control unit 110 may generate at least one test case using the generated attack script.

The fuzzing algorithm may comprise at least one of a dump fuzzing algorithm, a generation-based fuzzing algorithm, a mutation-based fuzzing algorithm, an evolutionary fuzzing algorithm, and a stateful fuzzing algorithm.

The dump fuzzing algorithm may be an algorithm that generates test cases without any information about the system. The control unit 110 may generate test cases using the dump fuzzing algorithm, which randomly generates given input values. Here, the system or target system may refer to the target control device and the in-vehicle network.

The generation-based fuzzing algorithm may be an algorithm that generates test cases for the fuzzing target based on a script-based generation method. Here, the script-based generation method may be an algorithm that provides data information of the target to be fuzzed in the form of a Python script and generates test cases based on it. The generation-based fuzzing algorithm may generate test cases based on format information of data input to the target system. The generation-based fuzzing algorithm may extract information about message structure, type, and internal fields of messages from specifications or RFC documents and generate test cases by adding abnormal data to a part of the normal input format. The control unit 110 may generate test cases by adding abnormal data to a part of the normal input format through the generation-based fuzzing algorithm.

The mutation-based fuzzing algorithm may be an algorithm that collects legitimate data input to the target system and utilizes it as test cases. The mutation-based fuzzing algorithm may generate test cases by adding abnormal data to legitimate data collected from files or network traffic. The control unit 110 may generate test cases by adding abnormal data to legitimate data through the mutation-based fuzzing algorithm.

The evolutionary fuzzing algorithm may be an algorithm that determines the generation of the next fuzzing data based on the reaction of the system after providing fuzzing data to the target system. The evolutionary fuzzing algorithm may assign scores to test cases performed based on the reaction of the target system to the fuzzing execution and utilize test cases with high scores for generating the next test cases. The control unit 110 may determine the generation of the next fuzzing data based on the reaction of the system after providing fuzzing data to the target system through the evolutionary fuzzing algorithm.

The stateful fuzzing algorithm may be an algorithm that generates fuzzing data based on the state of the target system. If the target system has multiple states and processes inputs differently for each state, the control unit 110 may generate test cases using the stateful fuzzing algorithm.

The control unit 110 may generate at least one test case using at least one algorithm among the dump fuzzing algorithm, the generation-based fuzzing algorithm, the mutation-based fuzzing algorithm, the evolutionary fuzzing algorithm, and the stateful fuzzing algorithm, depending on the type of the in-vehicle network or the target control device.

The control unit 110 may inject a first test case among the at least one test case into a target control device constituting the in-vehicle network (S230). Alternatively, the control unit 110 may inject the first test case into the in-vehicle network.

Specifically, the control unit 110 may inject the first test case into the target control device through a fuzzing framework in which a third requirement for the protocol of the in-vehicle network is constructed.

The control unit 110 may perform an analysis on whether the target control device is abnormal according to the injection of the first test case (S240).

Specifically, the control unit 110 may inject the first test case into the target control device. The control unit 110 may transmit a status check message to the target control device. Then, the control unit 110 may determine whether the target control device is abnormal based on whether a response to the status check message is received. Hereinafter, an example of a method in which the control unit 110 performs an analysis on whether the target control device is abnormal according to the injection of the first test case will be described with reference to FIG. 5.

The control unit 110 may determine whether to inject a second test case among the at least one test case based on whether the target control device is abnormal (S250).

For example, if the control unit 110 determines that an abnormality has occurred in the target control device, the control unit 110 may determine the first test case as a vulnerable case. Then, the control unit 110 may not inject the second test case.

In another example, if the control unit 110 determines that no abnormality has occurred in the target control device, the control unit 110 may inject the second test case.

After the injection of the first test case or the second test case, the control unit 110 may generate a result report according to the injection of the test case through a fuzzing framework in which a sixth requirement for the result report is constructed.

Additionally, the control unit 110 may output a log file according to the injection of the test case through a fuzzing framework in which a fourth requirement for logging of the in-vehicle network is constructed.

According to the above configuration, the computing device 100 may perform the security evaluation method using a fuzzing framework constructed to satisfy multiple requirements. Accordingly, the reliability of performing the security evaluation method may be high, and furthermore, the records of the test may be completely preserved.

Meanwhile, according to some embodiments of the present disclosure, the computing device 100 may perform an analysis on whether the target control device is abnormal according to the injection of the first test case. Hereinafter, an example of a method in which the computing device 100 performs an analysis on whether the target control device is abnormal according to the present disclosure will be described with reference to FIG. 5.

Figure 5:
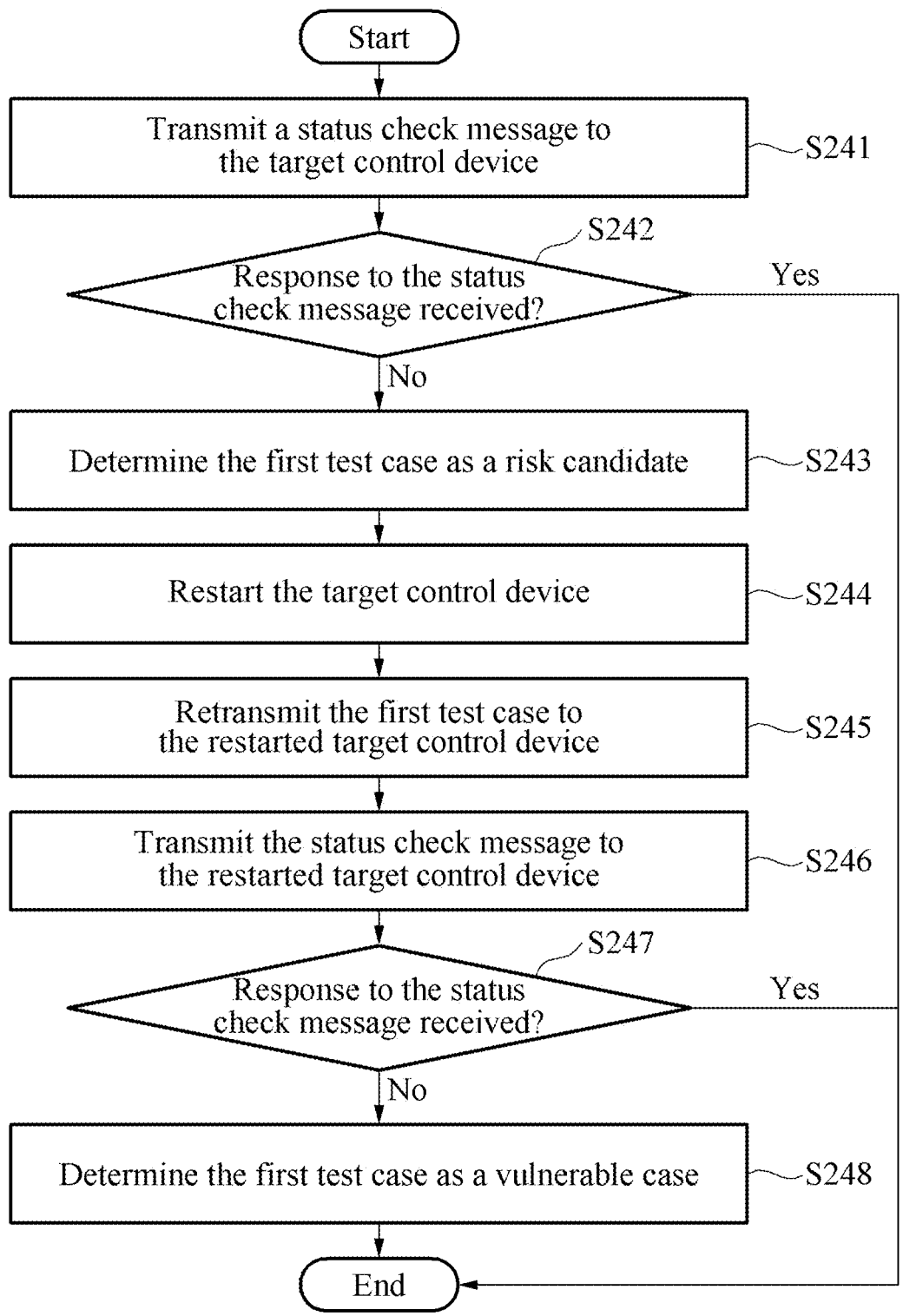
FIG. 5 is a flowchart illustrating an example of a method for performing an analysis on whether a target control device is abnormal performed by a computing device according to some embodiments of the present disclosure.

FIG. 5 is a flowchart illustrating an example of a method in which a computing device according to some embodiments of the present disclosure performs an analysis on whether the target control device is abnormal.

Referring to FIG. 5, the control unit 110 of the computing device 100 may transmit a status check message to the target control device (S241). Here, the status check message may be a message requesting a response from the target control device.

If a response to the status check message is not received (S242, No), the control unit 110 may determine the first test case as a risk candidate (S243). The control unit 110 may database the first test case in the storage unit 120.

If a response to the status check message is received (S242, Yes), the control unit 110 may not determine the first test case as a risk candidate.

The control unit 110 may restart the target control device (S244). The control unit 110 may retransmit the first test case to the restarted target control device (S245). Then, the control unit 110 may transmit the status check message to the restarted target control device (S246).

If a response to the retransmitted status check message is not received (S247, Yes), the control unit 110 may determine the first test case as a vulnerable case (S248).

The control unit 110 may not determine the first test case as a vulnerable case if a response to the status check message is received (S247, No).

According to one embodiment, the control unit 110 may retransmit the first test case, which has not been determined as a vulnerable case, to the target control device when the state of the target control device has changed.

Specifically, the first test case may be a test case determined as a risk candidate. Accordingly, the first test case injected into the target control device with a changed state may become a vulnerable case. Therefore, the control unit 110 may retransmit the first test case to the target control device with a changed state when the state of the target control device has changed. Additionally, the control unit 110 may determine whether to decide the first test case as a vulnerable case based on the response to the status check message.

According to one embodiment, the fuzzing framework may construct a fifth requirement for replay of an attack method for the target control device. The control unit 110 may perform an analysis on whether the target control device is abnormal by retransmitting the test case through the fuzzing framework in which a fifth-1 requirement for enabling a replay attack using the corresponding message when a vulnerability of the target control device is discovered in response to an attack on the target control device, a fifth-2 requirement for automatically proceeding with replay, and a fifth-3 requirement for manually proceeding with replay are constructed.

The descriptions of the presented embodiments are provided to enable any person skilled in the art to utilize or implement the present disclosure. Various modifications to these embodiments will be apparent to those skilled in the art, and the general principles defined herein may be applied to other embodiments without departing from the scope of the present disclosure. Thus, the present disclosure is not limited to the embodiments presented herein but is to be accorded the broadest scope consistent with the principles and novel features disclosed herein.

What is claimed is:

1. A method for evaluating security of an in-vehicle network performed by a computing device including at least one processor, comprising:
   constructing a fuzzing framework for performing a security evaluation method; and
   performing the security evaluation method using the fuzzing framework;
   wherein the security evaluation method comprises:
   extracting a message list from a CAN DB file;
   generating at least one test case using messages included in the message list;
   injecting a first test case among the at least one test case into a target control device constituting the in-vehicle network;
   performing an analysis on whether the target control device is abnormal according to an injection of the first test case; and
   determining whether to inject a second test case among the at least one test case based on whether the target control device is abnormal;
   wherein the generating at least one test case using messages included in the message list comprises:
   generating the at least one test case according to a fuzzing algorithm;
   wherein the fuzzing algorithm comprises at least one of dump fuzzing algorithm, generation based fuzzing algorithm, mutation-based fuzzing algorithm, evolutionary fuzzing algorithm, and stateful fuzzing algorithm,
   wherein the constructing a fuzzing framework for performing the security evaluation method comprises:
   constructing a first requirement for a scope of a fuzzer;
   constructing a second requirement for the at least one test case;
   constructing a third requirement for a protocol of the in-vehicle network;
   constructing a fourth requirement for logging of the in-vehicle network;
   constructing a fifth requirement for replay of an attack method for the target control device; and
   constructing a sixth requirement for a result report.

2. The method for evaluating security of an in-vehicle network according to claim 1, wherein the first requirement comprises at least one of a first-1 requirement for generating a test case for a pre-set message in the CAN DB file, a first-2 requirement for performing a fuzzing test for a UDS (Unified Diagnostic Services) protocol message, a first-3 requirement for performing fuzzing through randomization of data within a designated range, and a first-4 requirement for performing fuzzing through randomization of the entire CAN message.

3. The method for evaluating security of an in-vehicle network according to claim 1, wherein the second requirement comprises at least one of a second-1 requirement for generating a test case based on a user-set structure and a second-2 requirement for enabling modification of the generated test case.

4. The method for evaluating security of an in-vehicle network according to claim 1, wherein the third requirement comprises at least one of a third-1 requirement for a protocol for supporting CAN communication and CAN-FD communication and a third-2 requirement for a protocol for supporting Ethernet.

5. The method for evaluating security of an in-vehicle network according to claim 1, wherein the fourth requirement comprises at least one of a fourth-1 requirement for logging all CAN messages in CAN communication, a fourth-2 requirement for logging all messages in connected CAN communication, and a fourth-3 requirement for output and extraction of a log file.

6. The method for evaluating security of an in-vehicle network according to claim 1, wherein the fifth requirement comprises at least one of a fifth-1 requirement for enabling a replay attack when a vulnerability of the target control device is discovered in response to an attack on the target control device using a corresponding message, a fifth-2 requirement for automatically proceeding with replay, and a fifth-3 requirement for manually proceeding with replay.

7. The method for evaluating security of an in-vehicle network according to claim 1, wherein the sixth requirement comprises at least one of a sixth-1 requirement for providing a report on discovered vulnerabilities and a sixth-2 requirement for extracting a final discovered vulnerability result as a local file.

8. A method for evaluating security of an in-vehicle network performed by a computing device including at least one processor, comprising:
   constructing a fuzzing framework for performing a security evaluation method; and
   performing the security evaluation method using the fuzzing framework;
   wherein the security evaluation method comprises:
   extracting a message list from a CAN DB file;
   generating at least one test case using messages included in the message list;

injecting a first test case among the at least one test case into a target control device constituting the in-vehicle network;

performing an analysis on whether the target control device is abnormal according to an injection of the first test case; and determining whether to inject a second test case among the at least one test case based on whether the target control device is abnormal;

wherein the generating at least one test case using messages included in the message list comprises:

generating the at least one test case according to a fuzzing algorithm;

wherein the fuzzing algorithm comprises at least one of dump fuzzing algorithm, generation based fuzzing algorithm, mutation-based fuzzing algorithm, evolutionary fuzzing algorithm, and stateful fuzzing algorithm, wherein the performing an analysis on whether the target control device is abnormal according to an injection of the first test case comprises:

transmitting a status check message to the target control device;

determining the first test case as a risk candidate when a response to the status check message is not received;

restarting the target control device;

retransmitting the first test case to the restarted target control device;

transmitting the status check message to the restarted target control device; and determining the first test case as a vulnerable case when a response to the status check message is not received.

9. A computing device for evaluating security of an in-vehicle network, comprising:

a control unit configured to construct a fuzzing framework for performing a security evaluation method and perform the security evaluation method using the fuzzing framework;

wherein the security evaluation method comprises:

extracting a message list from a CAN DB file;

generating at least one test case using messages included in the extracted message list;

injecting a first test case among the at least one test case into a target control device constituting the in-vehicle network;

performing an analysis on whether the target control device is abnormal according to an injection of the first test case; and determining whether to inject a second test case among the at least one test case based on whether the target control device is abnormal wherein the generating at least one test case using messages included in the message list comprises:

generating the at least one test case according to a fuzzing algorithm;

wherein the fuzzing algorithm comprises at least one of dump fuzzing algorithm, generation based fuzzing algorithm, mutation-based fuzzing algorithm, evolutionary fuzzing algorithm, and stateful fuzzing algorithm, wherein the control unit configured to:

constructing a first requirement for a scope of a fuzzer;

constructing a second requirement for the at least one test case;

constructing a third requirement for a protocol of the in-vehicle network;

constructing a fourth requirement for logging of the in-vehicle network;

constructing a fifth requirement for replay of an attack method for the target control device; and constructing a sixth requirement for a result report.

* * * * *